O. SELG.
PERCOLATOR.
APPLICATION FILED AUG. 17, 1911.
1,015,407.
Patented Jan. 23, 1912.
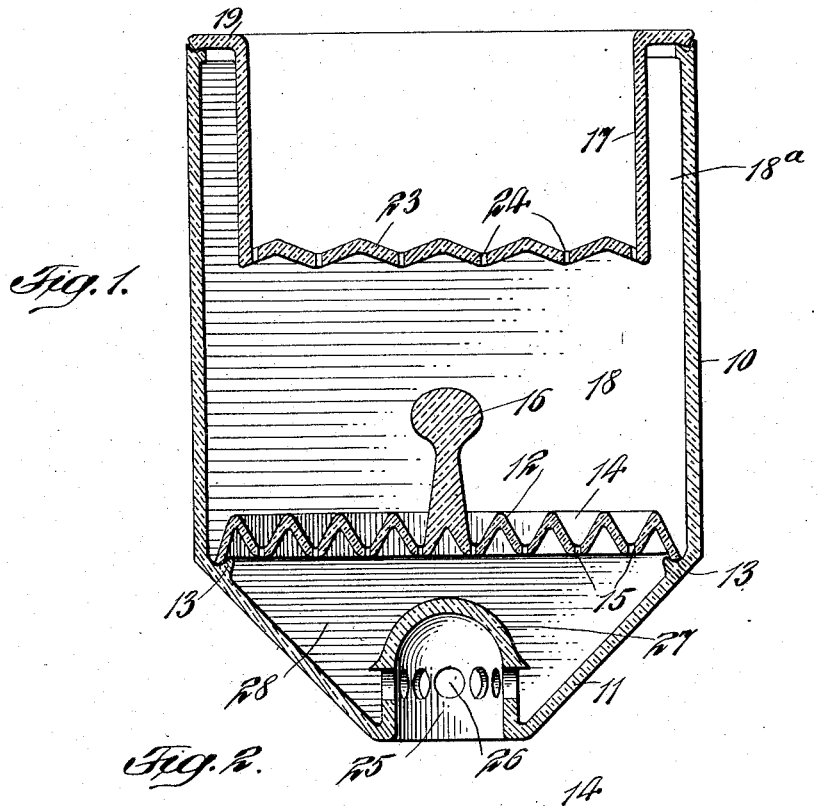
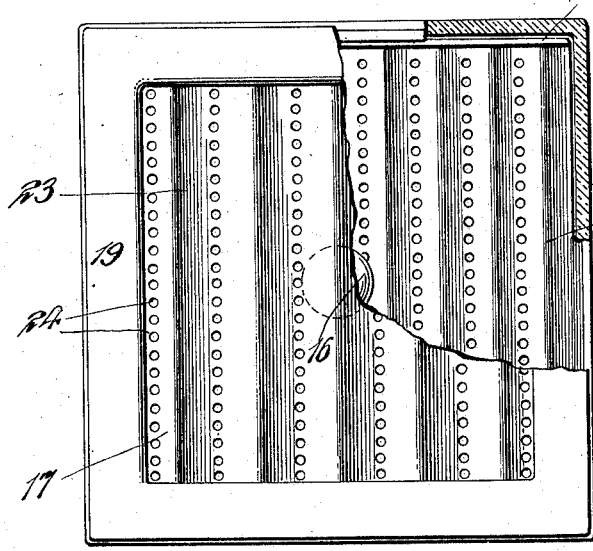
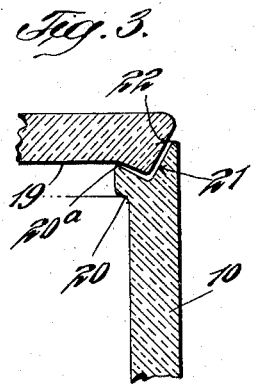
Witnesses:
Daniel Holmgren.
Inventor
Otto Selg
By his Attorneys

UNITED STATES PATENT OFFICE.

OTTO SELG, OF NEW YORK, N. Y.

PERCOLATOR.

1,015,407.  Specification of Letters Patent.  Patented Jan. 23, 1912.

Application filed August 17, 1911. Serial No. 644,637.

*To all whom it may concern:*

Be it known that I, OTTO SELG, a citizen of the United States, residing at New York city, county and State of New York, have invented a new and Improved Percolator, of which the following is a specification.

This invention relates to a percolator of novel construction, more particularly designed for effectively extracting the solvent principle from coffee though it may also be used for other purposes.

The percolator presents an extensive filtering area, prevents the escape of the charged vapors, and may be readily dismembered and cleaned.

In the accompanying drawing: Figure 1 is a vertical longitudinal section of a percolator embodying my invention; Fig. 2 a plan thereof, partly in section and partly broken away, and Fig. 3 a detail of the joint between casing and cup.

The percolator comprises essentially a casing 10 of square or other form and having a tapering bottom 11 adapted to be seated upon a coffee pot or other receptacle.

Within casing 10 there is fitted a correspondingly shaped corrugated strainer plate 12 seated within grooves 13 of bottom 11 so as to extend across the entire width of the casing. Plate 12 is provided with end flanges 14 and with a plurality of apertures 15 within each of its furrows. A handle 16 of strainer 12 permits it to be readily lifted out of the casing. Within casing 10 and at a distance above strainer 12, there is suspended a cup 17 adapted for the reception of water or other leaching liquid. Cup 17 is of considerably less width than casing 10, so that the percolating chamber 18 above the strainer encompasses the cup to form a surrounding vapor and air space 18$^a$. In order to sustain cup 17 in position, it is provided with an upper laterally extending flange 19 that rests upon the rim 20 of the casing. To obtain a tight joint between said rim and flange and to properly center the cup, rim 20 is provided with a V-shaped groove 21 adapted to accommodate a beveled ledge 22 of flange 19. The flare of groove 21 is however somewhat greater than the flare of ledge 22, so that the ledge clears the groove, excepting along the inner edge 20$^a$ of rim 20. In this way a tight joint is obtained along this edge without accurately fitting one member of the joint to the other, while furthermore a liquid seal is adapted to be formed between casing and cup. The bottom 23 of cup 17 is also corrugated and apertured as at 24, but its ridges are somewhat lower and wider than those of strainer 12.

From the center of bottom 11 extends upwardly a trap 25 having lateral openings 26 and an overhanging roof 27.

In use the ground coffee or other substance from which the active principle is to be extracted, is placed on strainer 12, cup 17 is fitted in position, and hot water is poured into the cup. This water will flow dropwise into chamber 18 and will thus thoroughly dissolve the coffee. The air thus liberated from the coffee, as well as the vapors generated will rise within the space 18$^a$ encompassing cup 17 and will thus create a pressure which will tend to prevent the formation of air bubbles in the percolating chamber 18. The steam forced through joint 20$^a$ will condense within groove 21 to form a liquid seal. The filtrate will flow through strainer 12 into the chamber 28 located below the strainer and out of openings 26, any sediments being retained by trap 25.

It will be seen that my percolator thoroughly extracts the active principle, avoids loss and may be readily taken apart and cleaned.

I claim:

A percolator comprising a casing having a grooved rim, a strainer plate fitted within the casing and extending across the entire width thereof, a perforated cup having a laterally extending flange and a beveled ledge on said flange that engages the rim-groove and has a flare less than the flare of said groove, whereby the ledge clears the groove excepting along the inner edge of the rim to form a liquid seal, the width of the cup being materially less than the width of the casing whereby the percolating chamber formed between the strainer plate and the bottom of the cup is extended upwardly to constitute an air space that communicates with the percolating chamber and surrounds the cup.

OTTO SELG.

Witnesses:
 FRANK V. BRIESEN,
 KATHERYNE KOCH.

Copies of this patent may be obtained for five cents each, by addressing the "Commissioner of Patents, Washington, D. C."